United States Patent [19]
Kovar et al.

[11] Patent Number: 5,977,249
[45] Date of Patent: Nov. 2, 1999

[54] LIQUID SILICONE RUBBER WITH IMPROVED COMPRESSION SET

[75] Inventors: Ingomar Kovar, Burghausen; Johann Kammerer, Julbach; Klaus-Michael Matejcek, Burghausen; Erhard Bosch, Winhoering; Walter Strassberger, Altoetting, all of Germany

[73] Assignee: Wacker-Chemie GmbH, Germany

[21] Appl. No.: 08/891,922

[22] Filed: Jul. 14, 1997

[30] Foreign Application Priority Data

Aug. 29, 1996 [DE] Germany ............... 196 34 971

[51] Int. Cl.$^6$ ..................... C08K 5/53
[52] U.S. Cl. ............. 524/723; 524/82; 524/742; 524/750; 528/15; 528/23
[58] Field of Search ............ 524/82, 723, 742, 524/750; 528/23, 15

[56] References Cited

U.S. PATENT DOCUMENTS

| | | |
|---|---|---|
| 3,261,801 | 7/1966 | Wormuth . |
| 3,468,838 | 9/1969 | Loraine et al. . |
| 3,715,334 | 2/1973 | Karstedt . |
| 3,775,452 | 11/1973 | Karstedt . |
| 3,814,730 | 6/1974 | Karstedt . |
| 3,865,778 | 2/1975 | Christie . |
| 4,260,726 | 4/1981 | Deubzer et al. . |
| 4,394,317 | 7/1983 | McAfee et al. . |
| 4,929,669 | 5/1990 | Jensen ..................... 524/861 |
| 5,104,919 | 4/1992 | Okami et al. . |
| 5,153,244 | 10/1992 | Akitomo et al. . |
| 5,260,364 | 11/1993 | Johnson ..................... 524/413 |
| 5,438,094 | 8/1995 | Fujiki et al. ............... 524/730 |
| 5,525,564 | 6/1996 | McAfee et al. ............ 502/105 |
| 5,548,066 | 8/1996 | Hirabayashi et al. ....... 524/82 |

FOREIGN PATENT DOCUMENTS

| | | |
|---|---|---|
| 0582255 | 2/1954 | European Pat. Off. . |
| 0377185 | 3/1955 | European Pat. Off. . |
| 0006172 | 1/1980 | European Pat. Off. . |
| 0010708 | 8/1982 | European Pat. Off. . |
| 0278157 | 8/1988 | European Pat. Off. . |
| 0377185 | 7/1990 | European Pat. Off. . |
| 0384325 | 8/1990 | European Pat. Off. . |
| 0455078 | 11/1991 | European Pat. Off. . |
| 0654497 | 5/1995 | European Pat. Off. . |
| 3319251 | 4/1984 | Germany . |
| 4100217 | 7/1992 | Germany . |

OTHER PUBLICATIONS

Patent Abstracts of Japan vol. 17, No. 274 (C–1064), b JP 05 009 388 (Toray Dow Corning Silicone Co. Ltd.).

*Primary Examiner*—Melvyn I. Marquis
*Assistant Examiner*—Mark W. Milstead
*Attorney, Agent, or Firm*—Brooks & Kushman P.C.

[57] ABSTRACT

The present invention relates to compositions which crosslink to give elastomers, comprising;

(A) a polyorganosiloxane (I) with at least two alkenyl groups per molecule and a metallic catalyst (IV) and (B) a polyorganosiloxane (II) with at least two silicon-bonded hydrogen atoms and an organic sulfur compound (III).

19 Claims, No Drawings

LIQUID SILICONE RUBBER WITH IMPROVED COMPRESSION SET

BRIEF SUMMARY OF THE INVENTION

The present invention relates to compositions which crosslink to give elastomers, to a process for their preparation and to shaped articles produced from these compositions.

BACKGROUND OF THE INVENTION

Compositions which crosslink to give elastomers and are said to have a low compression set have already been described.

DE 41 00 217 (Degussa AG) discloses that thiocyanatopropyltrialkoxysilanes can bring about an improvement of the compression set in molding compositions which can be vulcanized using peroxides together with heat. The same disclosure describes that the organosilicon compounds can be used either separately or in combination with a filler. DE 33 19 251 (Degussa AG) discloses the use of isothiuronium compounds in place of thiourea derivatives for vulcanizable halogen rubber mixtures. The resultant vulcanizates were found to have better strength, tensile modulus, abrasion and compression set values than comparable halogen rubber mixtures without isothiuronium compounds. In EP 0 278 157 (Shin Etsu Chemical Co., Ltd.), thiocarbamyl-functional organosilanes are added, in order to improve the compression set, to rubbers which are vulcanizable using organic sulfur compounds or using organic peroxides.

Other proposals for improving the compression set are based on the use of additives such as, barium peroxide, barium oxide or magnesium oxide (U.S. Pat. No. 3,261,801, U.S. Pat. No. 3,468,838 and U.S. Pat. No. 3,865,778), and the use of polycarbodiimidepolysiloxane copolymers (EP 0 010 708) which give strongly colored products.

The above mentioned methods for improving the compression set are relevant to rubbers which may be crosslinked to give elastomers by using organic sulfur compounds or organic peroxides.

By contrast, organopolysiloxane compositions which crosslink via an addition reaction, preferably via a hydrosilylation reaction of vinyl-containing siloxanes, are catalyzed by a number of platinum compounds. For improving the compression set in addition-crosslinking systems, iron-manganese spinels of the empirical formula $Fe_yMn_zO_4$ (Wacker Silicones: EP 582 299), triazole compounds (Shin Etsu Chemical Co., Ltd.: U.S. Pat. No. 510,49,19), vinyl-specific organic peroxides >0.2% by weight (Dow Corning Co.: EP 0 377 185), and transition metal chalcogenides (Bayer AG:EP 0 455 078) have been described.

The above mentioned compositions have the disadvantage that they do not provide addition-crosslinking compositions which are transparent and have a low compression set.

DETAILED DESCRIPTION OF THE INVENTION

It is an object of the present invention to provide compositions which do not include breakdown products, as do systems which crosslink using peroxides, are more viscous than the latter, and have a low compression set with, at the same time, high reproduceability of the compression set after storage.

The present invention relates to compositions which crosslink to give elastomers, comprising;

(A) a polyorganosiloxane (I) with at least two alkenyl groups per molecule and a metallic catalyst (IV) and
(B) a polyorganosiloxane (II) with at least two silicon-bonded hydrogen atoms and an organic sulfur compound (III).

Component (A) comprises polyorganosiloxane (I). Polyorganosiloxane (I) in the novel silicone rubber compositions is a polyorganosiloxane with at least two alkenyl groups per molecule and a viscosity at 25° C. which is in the range from 0.5 to 500 Pa.s, preferably from 1 to 100 Pa.s and more preferably from 7 to 25 Pa.s. Polyorganosiloxane (I) is used in amounts of between 10% and 98% by weight, preferably 20% and 80% by weight and more preferably between 50% and 80% by weight.

Component (A) may also include further additives as described below.

Component (B) comprises polyorganosiloxane (II), an organic sulfur compound (III), and may include polyorganosiloxane (I) and further additives as described below.

Polyorganosiloxane (II) in the novel silicone rubber compositions is a polyorganosiloxane with at least two Si-H groups per molecule with a viscosity at 25° C. which is in the range from 100 to 1000 mPa.s, preferably from 200 to 500 mPa.s.

The polyorganosiloxane (I) is constructed from units of the formula

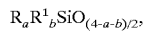
$$R_aR^1{}_bSiO_{(4-a-b)/2},$$

where
a is 0, 1 or 2,
b is 0, 1, 2 or 3,
with the proviso that at least two radicals R are present in every molecule and the sum (a+b) is <4.

R is an alkenyl group, which can undergo a hydrosilylation reaction using an SiH functional crosslinking agent. It is advantageous to use alkenyl groups with from 2 to 6 carbon atoms, such as vinyl, allyl, methallyl, 1-propenyl, 5-hexenyl, ethynyl, butadienyl, hexadienyl, cyclopentenyl, cyclopentadienyl, cyclohexenyl, preferably vinyl and allyl.

$R^1$ is a substituted or unsubstituted, aliphatically saturated or aromatic, monovalent hydrocarbon radical with from 1 to 10 carbon atoms, preferably from 1 to 6 carbon atoms, examples of which are the alkyl groups, such as preferably methyl, ethyl, propyl, butyl and hexyl, cycloalkyl groups, such as cyclopentyl, cyclohexyl and cycloheptyl, aryl and alkaryl groups, such as phenyl, tolyl, xylyl, mesityl, benzyl, beta-phenylethyl and naphthyl, and halogen-substituted groups, such as 3,3,3-trifluoropropyl, o-, p- and m-chlorophenyl, bromotolyl and beta-cyanoethyl.

The alkenyl groups may be bonded at any position in the polymer chain, in particular on the terminal silicon atoms.

Polyorganosiloxane (I) may also be a mixture of different polyorganosiloxanes which contain alkenyl groups, differing for example in their alkenyl group content, in the type of alkenyl group or structurally.

The structure of the polyorganosiloxanes which contain alkenyl groups may be linear or branched. Besides monofunctional units, such as $RR^1{}_2SiO_{1/2}$ and $R^1{}_3SiO_{1/2}$, and difunctional units, such as $R^1{}_2SiO_{2/2}$ and $RR^1SiO_{2/2}$, branched polyorganosiloxanes also comprise trifunctional units, such as $R^1SiO_{3/2}$ and $RSiO_{3/2}$, and/or tetrafunctional units of the formula $SiO_{4/2}$, where R and $R^1$ are as defined above. The content of these tri- and/or tetrafunctional units which lead to branched polyorganosiloxanes should not significantly exceed 20 mole %. The polyorganosiloxane which contains alkenyl groups may also contain units of the formula —OSi(R²R³)R⁴Si(R²R³)O—, where both R² and R³ are as defined above for R and R¹, and R⁴ is a bivalent organic radical, such as ethylene, propylene, phenylene, diphenylene or polyoxymethylene.

Units of this type may be present in the polyorganosiloxane (I) in a proportion of up to 50 mole %.

Preference is given to the use of polydimethylsiloxanes which contain vinyl groups and have the formula $$(ViMe_2SiO_{1/2})_2(ViMeSiO)_a(Me_2SiO)_b,$$

where a is zero or a non-negative number and b is a non-negative number, and the following relationships are satisfied:

$$50<(a+b)<2200, \text{ preferably } 200<(a+b)<1000.$$

The crosslinker used in the addition-crosslinking of the novel silicone rubber composition is polyorganosiloxane (II), which is an SiH-functional polyorganosiloxane constructed from units of the formula $$H_cR^1_dSiO_{(4-c-d)/2},$$

where c is 0, 1 or 2, d is 0, 1, 2 or 3, with the proviso that the sum (c+d) is <4 and that at least two hydrogen atoms bonded to silicon are present in each molecule, and R¹ is as defined above.

Preference is given to the use of a polyorganosiloxane which contains three or more SiH-bonds per molecule. If a polyorganosiloxane (II) containing only two SiH-bonds per molecule is used, the polyorganosiloxane (I) which contains alkenyl groups preferably contains at least three alkenyl groups per molecule.

The polyorganosiloxane (II) is used as crosslinker. The hydrogen content of the crosslinker, which relates exclusively to the hydrogen atoms bonded directly to silicon atoms, is in the range from 0.002% to 1.7% by weight of hydrogen, preferably from 0.1% to 1.7% by weight of hydrogen.

The polyorganosiloxane (II) contains at least three and preferably at most 600 silicon atoms per molecule. Preference is given to the use of SiH-crosslinkers which contain between 4 and 200 silicon atoms per molecule.

The structure of the polyorganosiloxane (II) may be linear, branched, cyclic or network-like. Linear and cyclic polyorganosiloxanes (II) are composed of units of the formulae $HR^1_2SiO_{1/2}$, $R^1_3SiO_{1/2}$, $HR^1SiO_{2/2}$, where R¹ is as defined above. Branched and network-like polyorganosiloxanes (II) contain, in addition, trifunctional units, such as $HSiO_{3/2}$ and $R^1SiO_{3/2}$, and/or tetrafunctional units of the formula $SiO_{4/2}$. As the content of tri- and/or tetrafunctional units increases, these crosslinking agents show a network-like, resin-like structure. The organic radicals R¹ in the polyorganosiloxane (II) are usually selected so that they are compatible with the organic radicals in the polyorganosiloxane (I), so that the constituents (I) and (II) are miscible.

Combinations and mixtures of the polyorganosiloxanes (II) described may also be used as crosslinker.

Preferred polyorganosiloxanes (II) have the formula $$(HR^1_2SiO_{1/2})_e(R^1_3SiO_{1/2})_f(HR^1SiO_{2/2})_g(R^1_2SiO_{2/2})_h,$$

where the non-negative integers e, f, g and h satisfy the following relationships: (e+f)=2, (e+g)>2, 5<(g+h)<200, and R¹ is as defined above.

Polyorganosiloxane (II) is present in the curable silicone rubber composition in an amount giving a molar ratio of SiH groups to alkenyl groups of from 0.5 to 5, preferably from 1.0 to 3.0.

Polyorganosiloxane (II) is used in amounts of from 0.1% to 15% by weight, preferably from 2% to 8% by weight, and more preferably from 3% to 6% by weight.

The metallic catalyst (IV) which is present in component (A) serves for the addition reaction (hydrosilylation) between the alkenyl groups of the polyorganosiloxane (I) and the silicon-bonded hydrogen atoms of the polyorganosiloxane (II). A large number of suitable hydrosilylation catalysts (IV) are described in the literature. Any hydrosilylation catalyst which is conventionally used in addition-crosslinking silicon rubber compositions may be used.

The hydrosilylation catalyst (IV) may be a metal, such as platinum, rhodium, palladium, ruthenium and iridium, preferably platinum, which optionally are supported on fine-particle carrier materials.

Platinum and platinum compounds are preferred. Preference is given to platinum compounds which are soluble in polyorganosiloxanes. Soluble platinum compounds which may be used are, the platinum-olefin complexes of the formulae $(PtCl_2.olefin)_2$ and $H(PtCl_3.olefin)$, where preference is given to alkenes having 2 to 8 carbon atoms, such as ethylene, propylene and isomers of butene and octene, or cycloalkenes with from 5 to 7 carbon atoms, such as cyclopentene, cyclohexene and cycloheptene. Other soluble platinum catalysts are the platinum-cyclopropane complex of the formula $(PtCl_2.C_3H_6)_2$, the reaction products of hexachloroplatinic acid with alcohols, ethers or aldehydes and/or mixtures of these, or the reaction product of hexachloroplatinic acid with methylvinylcyclotetrasiloxane in the presence of sodium bicarbonate in ethanolic solution. Preference is given to finely-divided platinum on carrier compositions such as silica, alumina or activated charcoal from vegetable or animal sources, platinum halides, such as $PtCl_4$, hexachloroplatinic acid and $Na_2PtCl_4.nH_2O$, platinum-olefin complexes, for example those with ethylene, propylene or butadiene, platinum-alcohol complexes, platinum-styrene complexes as described in U.S. Pat. No. 4,394,317, platinum alkoxide complexes, platinum acetylacetonates, reaction products of chloroplatinic acid with mono-ketones, such as cyclohexanone, methyl ethyl ketone, acetone, methyl n-propyl ketone, diisobutyl ketone, acetophenone and mesityl oxide, and also platinum-vinylsiloxane complexes as described, in U.S. Pat. Nos. 3,715,334, 3,775,452 and 3,814,730 and platinum-divinyltetramethyldisiloxane complexes with or without detectable amounts of inorganic halogen, in an amount which is sufficient to promote the curing of the formulation at a temperature from room temperature to 250° C., where the organohydrosiloxane and the hydrosilylation catalyst are allocated to different parts of the multipart curable formulation. Preference is given to complexes of platinum with vinylsiloxanes, such as sym-divinyltetramethyldisiloxane.

The hydrosilylation catalyst (IV) may also be used in microencapsulated form, where the fine-particle solid which contains the catalyst and is insoluble in the polyorganosiloxane is, for example, a thermoplastic (polyester resin or silicone resin). The hydrosilylation catalyst may also be used in the form of an inclusion compound, for example in a cyclodextrin.

The amount of hydrosilylation catalyst used depends on the desired rate of crosslinking and on cost factors. If common platinum catalysts are used, the content of platinum metal in the curable silicone rubber composition is in the range from 0.1 to 500 ppm by weight, preferably from 10 to 100 ppm by weight of platinum metal. Otherwise, the catalyst may be used with an inhibitor, preferably in amounts of from 0.01% to 5% by weight.

The sulfur compound (III) according to the invention is an organic sulfur compound selected, for example, from the group consisting of the thiols (mercaptans, such as alkylthiols and aryl thiols, mercaptoheterocyclic compounds, such as mercaptoimidazole and mercaptobenzimidazole), ketene S,X-acetals, where X is preferably N or S, thioacetals, sulfanes (thioethers), disulfanes (dithioethers), polysulfanes, thioamides, thioureas, thiurams (thiurammono-, di- or polysulfides, bisthiocarbamoylmono-, di- or polysulfanes), thiuronium salts, thiocarbamates, dithiocarbamates and their Zn, Fe, Ni, Co and Cu salts, thiocyanates, isothiocyanates, thiocarbonyl compounds (for example thioaldehydes, thioketones, thiolactones, thiocarboxylic carboxylic acids), thio-heterocyclics (for example thiophene, 1,2- and 1,3- dithiols and 1,2- and 1,3-di-thiolethiones, thiazoles, mercaptothiazoles, mercaptothiadiazoles, benzodithioles and benzodithiolethiones, benzthiazoles, mercaptobenzthiazoles, phenothiazines and thianthrenes), the presence of a silane having sulfur-containing functional groups, for example a mercaptoalkylalkylalkoxysilane of the formula $$(R^5O)_{3-n}R^6{}_nSi—R^7—SH, \quad (4)$$

a bis(trialkoxysilylalkyl)mono-, di- or polysulfane of the formula $$[(R^8O)_3Si—R^9—]_2—S_n, \quad (5)$$

a thiocyanatoalkyltrialkoxysilane of the formula $$(R^{10}O)_3Si—R^{11}—SCN, \quad (6)$$

the presence of a filler, preferably silicas, onto which these silanes having sulfur-containing functional groups are applied, or with which the latter are reacted or blended, for example fine-particle-size silica, and/or the presence of a thio-functional siloxane, for example a polydimethylsiloxane-co-mercaptoalkylsiloxane, where alkyl is preferably ethyl and propyl, in at least one part of the multipart formulation, preferably in the part containing H-siloxane.

$R^5$ is a substituted or unsubstituted, aliphatically saturated monovalent hydrocarbon radical having from 1 to 10 carbon atoms, preferably from 1 to 6 carbon atoms, examples of which are alkyl groups, preferably methyl, ethyl, propyl, butyl and hexyl, and cycloalkyl groups, such as cyclopentyl, cyclohexyl and cycloheptyl.

$R^6$ is a substituted or unsubstituted, aliphatically saturated monovalent hydrocarbon radical having from 1 to 10 carbon atoms, preferably from 1 to 6 carbon atoms, examples of which are alkyl groups, preferably methyl, ethyl, propyl, butyl and hexyl, cycloalkyl groups, such as cyclo-pentyl, cyclohexyl and cycloheptyl, and aryl and alkaryl groups, such as phenyl, tolyl, xylyl, mesityl and benzyl.

$R^7$ is a substituted or unsubstituted, aliphatically saturated bivalent hydrocarbon radical having from 1 to 10 carbon atoms, preferably from 1 to 6 carbon atoms, examples of which are alkylene groups, preferably methylene, ethylene, propylene, butylene, hexylene and phenylene, more preferably propylene.

$R^8$ and $R^{10}$ are as defined for $R^5$.
$R^9$ and $R^{11}$ are as defined for $R^7$.
n is 1–10, preferably 2 or 4.

Mixtures of these organic sulfur compounds may also be used.

The organic sulfur compound or mixtures of these is used in amounts of from 0.0001% to 2%, preferably from 0.001% to 0.2%, more preferably from 0.005% to 0.15%, based on the weight of the entire formulation.

The following additives may also be present in one of the components A or B.

While the constituents (I) to (IV) are necessary constituents of the novel silicone rubber composition, further additives may, optionally, be present in the silicone rubber composition in a proportion of up to 60% by weight, preferably from 1% to 20% by weight. These additives may, for example, be fillers, adhesion promoters, inhibitors, metal powders, fibers, pigments, dyes, plasticizers etc.

Examples of fillers are reinforcing fillers of a reinforcing inorganic filler, preferably of silicate type, such as fine-particle-size silica having a specific surface area of from 50 to 500 m²/g, preferably from 150 to 300 m²/g, and may also be surface-modified. They may be prepared, by precipitation from silicate solutions using inorganic acids and by hydrothermal development, by high-temperature hydrolysis and/or oxidation of volatile silicon halides, or by a luminous arc process. These silicas may, optionally, be in the form of mixed oxides or oxide mixtures with the oxides of aluminum, magnesium, calcium, barium, zinc, zirconium and/or titanium. Use may, furthermore, be made of non-reinforcing fillers, i.e. fillers having a BET specific surface area of less than 50 m²/g, such as quartz powder, diatomaceous earth, calcium silicate, zirconium silicate, zeolites, metal oxides, such as iron oxide, zinc oxide, titanium dioxide, aluminum oxide, metal carbonates, such as calcium carbonate, magnesium carbonate, zinc carbonate, metal sulfates, mica, siloxane resins, clays, lithophones, graphite and chalk. The fillers which are described may be hydrophobicized. Use may be made of synthetic silicates, naturally-occurring silicates, glass fibers and glass-fiber products, such as mats, strands, fabrics, non-wovens and the like, and glass microbeads. It is preferable to add from 10% to 60% of filler, based on the weight of the formulation.

Carbon black may also be present in the novel rubber compositions, not only for gray or black coloration of the vulcanizates, but also to achieve particular, valuable vulcanization properties, preference being given to the carbon blacks which are known for use in rubbers. The carbon black is used in amounts of from 0 to 35 parts by weight, based on 100 parts by weight of rubber, in at least one part of the multipart formulation. For the purposes of the present invention, a lower limit of zero means that the constituent is optionally present in the rubber mixture. If carbon black is present in a mixture, the lower limit in practice is 0.1 parts by weight.

In the case of oil-bleeding elastomers, an amount of from 0% to 10% of a filler, preferably from 0.1% to 5%, based on the weight of the formulation, of an organoarylsiloxane, preferably of a polydimethyl-co-methylphenyl-siloxane, is added. For the purposes of the present invention, a lower limit of zero means that the constituent is optionally present in the rubber mixture. If an organoarylsiloxane is present in a mixture, the lower limit in practice is 0.1 parts by weight.

Examples of plasticizers are diorganopolysiloxanes which are liquid at room temperature, and are end-blocked by triorganosiloxy groups, such as dimethylpolysiloxanes which are end-blocked by trimethylsiloxy groups and have a viscosity at 25° C. of from 10 to 10,000 mPa.s.

In particular, resin-like polyorganosiloxanes which essentially consist of units of the formulae $R^{12}_3SiO_{1/2}$, $R^{12}SiO_{3/2}$ and/or $SiO_{4/2}$ and optionally $R^{12}_2SiO_{2/2}$, in a proportion of up to 50% by weight, preferably up to 20% by weight, based on the total weight of the silicone rubber, may be present. The molar ratio between monofunctional and tri- or tetrafunctional units in these resin-like polyorganosiloxanes is preferably in the range from 0.5:1 to 1.5:1. Functional groups, in particular alkenyl groups in the form of $R^{13}R^{12}_2SiO_{1/2}$- and/or $R^{13}R^{12}SiO_{2/2}$- units, may also be present.

$R^{12}$ is a substituted or unsubstituted, aliphatically saturated monovalent hydrocarbon radical having from 1 to 10 carbon atoms preferably from 1 to 6 carbon atoms, examples of which are alkyl groups, such as methyl, ethyl, propyl, butyl and hexyl, cycloalkyl groups, such as cyclopentyl, cyclohexyl and cycloheptyl, aryl and alkaryl groups, such as phenyl, tolyl, xylyl, mesityl, benzyl, beta-phenylethyl and naphthyl, and halo-substituted groups, such as 3,3,3-trifluoropropyl, o-, p- and m-chlorophenyl, bromotolyl and beta-cyanoethyl.

$R^{13}$ is an alkenyl group, which may be any alkenyl group which can undergo a hydrosilylation reaction with an SiH-functional crosslinker. It is advantageous to use alkenyl groups having from 2 to 6 carbon atoms, such as vinyl, allyl, methallyl, 1-propenyl, 5-hexenyl, ethynyl, butadienyl, hexadienyl, cyclopentenyl, cyclopentadienyl and cyclohexenyl, preferably vinyl and allyl.

Additives may be present which enable the pot life and the rate of crosslinking of the curable silicone rubber composition to be set to the desired value. Examples of these inhibitors and stabilizers, which are known are: acetylenic alcohols, such as ethynylcyclohexanol and 2-methyl-3-butyn-2-ol, polymethylvinylcyclosiloxanes, such as methylvinylcyclotetrasiloxane, low-molecular-weight siloxane oils with vinyldimethylsiloxy end-groups, trialkyl cyanurates, alkyl maleates, such as diallyl maleate and dimethyl maleate, alkyl fumarates, such as diethyl fumarate and diallyl fumarate, organic hydroperoxides, such as cumene hydroperoxide, tert-butyl hydroperoxide and pinane hydroperoxide, organic peroxides, benzotriazole, organic sulfoxides, organic amines and amides, phosphines, phosphites, nitriles, diaziridines and oximes. Preference is given to siloxanes, and particular preference is given to 1,3-divinyl-1,1,3,3-tetramethyldisiloxane and tetramethyltetravinylcyclotetrasiloxane.

The novel silicone rubber compositions are preferably prepared by, in a first step, mixing the filler with the polyorganosiloxane (I) containing alkenyl groups to give a homogeneous mixture. The filler is incorporated into the polyorganosiloxane in a suitable mixer, e.g. a compounder.

Components (A) and (B) are used in a weight ratio of from 10:1 to 1:0.5, preferably of 1:1.

The invention further relates to a process in which component (A) is mixed with component (B).

Components (A) and (B) are as defined above. The components are intensively mixed at room temperature (25° C.) and atmospheric pressure. The mixture is then vulcanized for from 0.01 to 10 min, preferably from 0.02 to 5 min, at from 70° C. to 250° C., preferably at 90° C. to 180° C.

The invention further relates to a shaped article which comprises novel compositions or compositions prepared by the novel process.

The novel moldings are transparent, elastomeric moldings which can be colored if required, have good to very good mechanical properties and can be produced cost-effectively by the novel process. Moldings of this type are prepared by injection molding. Such moldings exhibit a lasting deformation on compression, the compression set. This deformation is especially large immediately following production, if there is no post-curing. In certain applications, e.g. gaskets in the automotive and engineering sectors where on technical or cost grounds there is often no post-curing of the moldings, it is essential in particular in the case of moldings which are not post-cured to achieve as low a compression set as possible. The invention achieves this object. However, post-curing is also possible according to the invention.

The good reproducibility of the compression set after storage if the organic sulfur compound is present in a small amount in component (B) is especially surprising. The rate of crosslinking in the novel moldings is therefore surprisingly lower than if the organic sulfur compound were present in component (A), even after relatively long storage times. This makes it possible to guarantee a shelf life of up to 6 months for the formulated product. The good shelf life therefore gives short, constant crosslinking times, which ensure fast and continuous production. This means that processing machines do not have to be repeatedly adjusted to take account of longer crosslinking times which can otherwise result from storage; this results in considerable cost savings, and because of the short cross-linking time more moldings can be produced.

The compositions which crosslink to give elastomers have a compression set, after vulcanization and without post-curing, of less than 50, preferably less than 25, and more preferably less than 10, where a value of 0 indicates no compression set at all. The compression set is measured according to DIN 53517.

It is characteristic of addition-crosslinking silicone rubbers that, in contrast to peroxide crosslinking, no breakdown products of the crosslinker are liberated. Addition-crosslinking liquid silicone rubbers also have a lower viscosity when compared with hard silicone rubbers and other elastomers. This favorable consistency and the crosslinking method lead to numerous advantages in processing, in particular in the cost-effective mass production of small moldings. A process without after-treatment, e.g. without post-curing of the moldings, is an important factor for automated production. A low compression set is advantageous for numerous applications in the field of sealing technology, e.g. O-rings, valve-cover gaskets, sealing lips, seals in dialysis machines and disposable syringes, cisterns, etc. Oil-bleeding silicone rubbers permit easy assembly and inhibit corrosion of electrical connections resulting from external agents. In this application, as weather packs, a low compression set in addition to other excellent mechanical properties, such as high tear resistance and elongation at break, offers technical advantages. It is for these reasons that the subject of the invention is of particular interest, since the highlighted sulfur-containing additives significantly improve the compression set without any substantial effect on the other mechanical properties and/or on the crosslinking behavior.

A common feature of the compounds described in the prior art is that they are not addition-crosslinking compositions which include organic sulfur compounds. The literature warns against the use of even the smallest amounts of organic sulfur compounds in addition-crosslinking systems, because of poisoning of the catalyst in such systems. "Ullmanns Enzyklopädie der technischen Chemie"[Ullmann's Encyclopedia of Industrial Chemistry], 4th Edition, Vol. 21, p.525, Verlag Chemie, 1982, takes the same view and states that the vulcanization behavior of addition systems is sensitive to disturbance by sulfur compounds, so that great care should be taken to avoid contamination by such compounds. Furthermore, catalyst poisoning in addition systems is referred to at the following points in text books: W. Hechtl, Chemie und Technologie des kalthärtenden Siliconkautschuks [Chemistry and Technology of RTV Silicone Rubber] in Silicone, Chemie und Technologie [Silicones, Chemistry and Technology], p. 49ff, Vulkan Verlag, 1989; Ullmann's Encyclopedia of Ind. Chem., 5th Edn., Vol. A5, p. 323, Verlag Chemie 1993, Weinheim; Ullmann's Encyclopedia of Ind. Chem., 5th Edn., Vol. A 24, p. 72, Verlag Chemie 1993, Weinheim; Ullmann's Encyclopedia of Ind. Chem., 4th Edn., Vol. 21, p. 522, 525, Verlag Chemie 1982, Weinheim.

EXAMPLE 1
Preparation of a Filler Which is Modified with Organosulfur Compounds 10 g of water, followed by 12.24 g of extremely finely divided 3-mercaptopropyltrimethoxysilane, obtainable from Wacker-Chemie as "Wacker Silan GF 70", are incorporated into 100 g of pyrogenic silica having a BET specific surface area of 300 $m^2/g$, obtainable from Wacker-Chemie as "Wacker HDK T30", with stirring, at room temperature and under atmospheric pressure, followed by post-curing for 1 hour at 80° C. Removal of reaction byproducts under reduced pressure gives 106.1 g of a white powder.

EXAMPLE 2
Preparation of a Batch for Improving Compression Set

In a compounder, 43.3 parts by weight of vinyl-terminated polydimethylsiloxane having a viscosity of 20 Pas are mixed with 20 parts by weight of a pyrogenic silica which has been surface-modified with hexamethyldisilazane and has a BET specific surface area of 300 $m^2/g$, and converted to a homogeneous mixture. To this mixture are added 10 parts by weight of a modified filler of Example 1, and homogenization is continued for 0.5 hours at 120° C. Finally, 26.7 parts by weight of vinyl-terminated polydimethylsiloxane having a viscosity of 20 Pas are incorporated.

EXAMPLE 3
Preparation of a Batch for Improvement of the Compression Set 10 parts by weight of octadecane-1-thiol are stirred into 90 parts by weight of vinyl-terminated polydimethylsiloxane having a viscosity of 20 Pas, at a temperature above its melting temperature, and converted to a homogeneous mixture.

EXAMPLE 4
Preparation of the Basic Mixture of a Liquid Rubber

Preparation of component A: in a compounder, 82 parts by weight of a vinyl-terminated polydimethylsiloxane having a viscosity of 20 Pas are mixed with 33 parts by weight of surface-modified pyrogenic silica having a BET specific surface area of 300 $m^2/g$, and converted to a homogeneous mixture. To 100 parts by weight of this basic silicone mixture are added 0.19 g of a platinum catalyst, consisting of 97 parts by weight of a polydimethylsiloxane and 3 parts by weight of a platinum-divinyltetramethyldisiloxane complex, and 0.07 parts by weight of ethynylcyclohexanol as inhibitor, and the mixture is homogenized in a compounder. Preparation of component B: in a compounder, 82 parts by weight of vinyl-terminated polydimethylsiloxane having a viscosity of 20 Pas are mixed with 33 parts by weight of surface-modified pyrogenic silica having a BET specific surface area of 300 $m^2/g$, and converted to a homogeneous mixture. To 100 parts by weight of this basic silicone mixture are added 4 parts by weight of a polydimethylsiloxane-co-hydromethylpolysiloxane and 0.03 parts by weight of ethynylcyclohexanol as inhibitor, and the mixture is homogenized in a compounder. The resultant curable basic silicone mixtures A and B are mixed in a ratio 1:1, pressed into sheets and vulcanized at 170° C. for 10 minutes. Test specimens were cut out from the cured sheets and tested, as prescribed in the indicated DIN specifications.

EXAMPLE 5
Preparation of an Oil-bleeding Liquid Rubber 2 parts by weight of a polydimethylsiloxane-co-methylphenylpolysiloxane are mixed in a compounder with each of the components A and B of Example 4. Press-vulcanization was carried out as in Example 4, for 5 minutes at 175° C.

EXAMPLE 6

0.25 parts by weight of an α, ω-trimethylsiloxy-terminated polydimethyl/3-mercaptopropylsiloxane, prepared according to U.S. Pat. No. 4,046,795, as in Example 11, and having a viscosity of about 0.25 Pas and an SH-content of about 0.1%, is mixed with 100 parts by weight of component B of Example 4, and vulcanization is carried out as in Example 4.

EXAMPLE 7

1 part by weight of the batch of Example 2, corresponding to about 0.1 parts by weight of the modified filler of Example 1, is mixed with 100 parts by weight of component B of Example 5, and vulcanization is carried out as in Example 5.

EXAMPLE 8

0.50 parts by weight of the batch of Example 3 are mixed with 100 parts by weight of component B of Example 5, and vulcanization is carried out as in Example 5.

Improvement of the compression set in liquid rubbers:

|  | Example 4 | Example 6 |
|---|---|---|
| Shore A hardness | 51 | 49 |
| Tear resistance [N/mm$^2$] | 8 | 9.5 |
| Elongation at break [%] | 460 | 540 |
| Tear propagation resistance [N/mm] | 28.9 | 32.9 |
| Rebound [%] | 62 | 63 |
| Compression set 22 h/175° C. [%] | 62 | 45 |
| Initiation temperature [° C.] | 120 | 120 |
| Vulcanization time t 50 [s] at 170° C. | 23 | 24 |
| Crosslinking rate vmax [Nm/min] | 1.29 | 1.21 |

Improvement of the compression set in oil-bleeding liquid rubbers:

|  | Example 5 | Example 7 | Example 8 |
|---|---|---|---|
| Shore A hardness | 49 | 47 | 47 |
| Tear resistance [N/mm$^2$] | 9 | 7.9 | 8.8 |
| Elongation at break [%] | 580 | 520 | 600 |

-continued

|  | Example 5 | Example 7 | Example 8 |
|---|---|---|---|
| Tear propagation resistance [N/mm] | 28 | 24.5 | 24.8 |
| Rebound [%] | 61 | 60 | 56 |
| Compression set 22 h/175° C. [%] | 64 | 17 | 37 |
| Initiation temperature [° C.] | 111 | 113 | 116 |
| Vulcanization time t 50 [s] at 150° C. | 18 | 17 | 26 |

DIN Specifications

DIN 53505—Shore A hardness
DIN 53504—Tear resistance, elongation at break
ASTM D 624—Tear propagation resistance
DIN 53512—Rebound
DIN 53517—Compression set
DIN 53529—Initiation temperature

What is claimed is:

1. A two component, addition-crosslinkable organopolysiloxane composition which crosslinks to give an elastomer, comprising;
   (A) a first component comprising a polyorganosiloxane (I) with at least two alkenyl groups per molecule and a metallic catalyst (IV) which promotes addition crosslinking, and
   (B) a second component comprising a polyorganosiloxane (II) with at least two silicon-bonded hydrogen atoms, and an organic sulfur compound (III).

2. A two component composition which crosslinks to give an elastomer, as claimed in claim 1, wherein component (B) further comprises a polyorganosiloxane (I).

3. A two component composition which crosslinks to give an elastomer, as claimed in claim 1, wherein the organic sulfur compound is supplied as a surface modified inorganic filler containing said sulfur compound.

4. A two component composition which crosslinks to give an elastomer, as claimed in claim 1, wherein the organic sulfur compound is 3-mercaptopropyltrimethoxysilane, 3-mercaptopropyltriethoxysilane, a polydimethylsiloxane-co-mercaptoalkyl compound, octadecane-1-thiol or mixture thereof.

5. A two component composition which crosslinks to give an elastomer, as claimed in claim 1, wherein the organic sulfur compound is present in amounts of from 0.0001% to 2% by weight, based on the weight of the entire composition.

6. A process for preparing an addition-crosslinked elastomer with low compression set which comprises mixing component (A) and component (B) of claim 1 together and curing the mixture obtained.

7. An addition-crosslinked organopolysiloxane elastomer with low compression set prepared by the process of claim 6, wherein the elastomer has not been post-cured.

8. A composition which crosslinks to give an elastomer, as claimed in claim 1, wherein the composition, when vulcanized but not post-cured, has low compression set of less than 50%.

9. A two component, addition-crosslinkable organopolysiloxane composition, comprising:
   (A) a first component comprising a polyorganosiloxane (I) with at least two alkenyl groups per molecule, and a metallic catalyst which promotes addition-crosslinking; and
   (B) a second component comprising a polyorganosiloxane (II) with at least two silicon-bonded hydrogen atoms per molecule, and an effective, compression set-reducing amount of a silane bearing at least one sulfur-containing group, a thio-functional siloxane, or a mixture thereof.

10. The two component composition of claim 9, wherein said silane bearing at least one sulfur-containing group comprises:
   a) a mercaptoalkyl alkylalkoxysilane of the formula $(R^5O)_{3-n}R^6_nSi-R^7-SH;$ 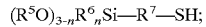

b) a bis(trialkoxysilylalkyl)mono-, di-, or polysulfane of the formula $\{(R^8O)_3Si-R^9\}_2S_n;$ 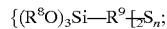

c) a thiocyanatoalkyltrialkoxysilane of the formula $(R^{10}O)_3Si-R^{11}-SCN;$ 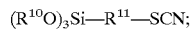

d) a filler which has been contacted with one or more of a), b) or c); or
   e) mixtures of any of a)–d),
wherein $R^5$ is a substituted or unsubstituted, aliphatically saturated monovalent hydrocarbon radical having from 1 to 10 carbon atoms, $R^6$ is a substituted or unsubstituted, aliphatically saturated monovalent hydrocarbon radical having from 1 to 10 carbon atoms, $R^7$ is a substituted or unsubstituted, aliphatically saturated bivalent hydrocarbon radical having from 1 to 10 carbon atoms,
   $R^8$ and $R^{10}$ are as defined for $R^5$,
   $R^9$ and $R^{11}$ are as defined for $R^7$, and
   n is 1–10.

11. The two component composition of claim 10 wherein said filler comprises silica.

12. The two component composition of claim 10 wherein said silane bearing at least one sulfur-containing group and said thio-functional siloxane comprises one or more compounds selected from the group consisting of
   3-mercaptopropyltrimethoxysilane,
   polydimethylsiloxane-co-mercaptoethylsiloxane, and
   polydimethylsiloxane-co-mercaptopropylsiloxane.

13. A two component, addition-crosslinkable organopolysiloxane composition which crosslinks to give an elastomer, comprising;
   (A) a first component comprising a polyorganosiloxane (I) with at least two alkenyl groups per molecule and a metallic catalyst (IV) which promotes addition crosslinking, and
   (B) a second component comprising a polyorganosiloxane (II) with at least two silicon-bonded hydrogen atoms, and an organic sulfur compound (III);
wherein said organic sulfur compound (III) is selected from a group consisting of thiols; mercaptoimidazoles; mercaptobenzimidazoles; ketene X,S-acetals; where X is N or S; thioacetals; sulfanes; disulfanes; polysulfanes; thioamides; thioureas; thiuram; bisthiocarbamoyl di- or polysulfanes; thiuronium salts; thiocarbamates; dithiocarbamates; and their Zn, Fe, Ni, Co, and Cu salts; thiocyanates; isothiocyanates; thioaldehydes; thioketones; thiolactones; thiocarboxylic acids; thiophene; 1,2- and 1,3-dithiols; 1,2- and 1,3-dithiolehtiones; mercaptothiazoles; mercaptodithiazoles; benzodithioles; benzodithiolethiones; benzthiazole; phenothiazines; thianthrenes; and mixtures thereof.

14. A two component composition which crosslinks to give an elastomer, as claimed in claim 13, wherein the organic sulfur compound is supplied as a surface modified inorganic filler containing said sulfur compound.

15. A two component composition which crosslinks to give an elastomer, as claimed in claim 13, wherein the organic sulfur compound is present in amounts of from 0.0001% to 2% by weight, based on the weight of the entire composition.

16. A method of decreasing the variation of compression set in two component addition-crosslinked organopolysiloxane elastomers which are stored prior to use, said method comprising adding to at least one component of said two component elastomer, from about 0.0001 weight percent to about 2 weight percent of an organic sulfur compound.

17. The two-component addition-crosslinkable composition of claim 1 which when cured is transparent.

18. The two-component addition-crosslinkable composition of claim 9 which when cured is transparent.

19. The two-component addition-crosslinkable composition of claim 13 which when cured is transparent.

* * * * *